Patented July 23, 1935

2,009,023

UNITED STATES PATENT OFFICE 2,009,023

MANUFACTURE OF PHENOLS

Walter Prahl, Ludwigshafen-on-the-Rhine, Germany, assignor to firm Dr. F. Raschig G. M. B. H., Ludwigshafen-on-the-Rhine, Germany, a firm of Germany No Drawing. Application June 25, 1930, Serial No. 463,834. In Germany July 6, 1929

8 Claims. (Cl. 260—154)

As is known, aromatic compounds containing chlorine in the nucleus show considerable resistance to hydrolysis. It is possible, indeed, by using a high temperature to hydrolyze chlorobenzene in presence of alkali in the liquid phase, so as to produce phenol with a yield that can be called commercial. The hydrolysis with water in the vapor phase, however, is not successful. Bergius & Meyer (Berichte 47, page 3155 and following), were unable to obtain commercially useful yields when using even a high temperature and various catalysts. Their best catalyst (aluminum oxide) yielded at highest 20 per cent. of the theoretical yield.

A recent inventor has found that chlorobenzene may be hydrolyzed in the vapor phase in presence of active silica gel used as a catalyst. The difference between the action of this active silica gel and that of other catalysts hitherto proposed, for instance aluminum oxide, appears to be due to the peculiar and remarkably high development of surface activity in the silica gel, which in this respect surpasses the other catalytic materials.

The poor result obtained by the said investigators is probably to be attributed to the fact that the materials used had not a sufficient degree of purity. For example, traces of iron, which are always present, have an extremely injurious effect.

It has been found that not all impurities are disadvantageous to the yield of phenol but that certain additions, on the contrary, improve the action of the catalyst, in that they depress the temperature of the reaction or enhance the quantity transformed at the same temperature.

In particular the addition of copper to a catalyst has proved favorable, in that the temperature at which a commercially useful speed of reaction is obtained is lower than when no such addition is made.

On the other hand, a catalyst containing about 5 per cent. of copper, induces the reaction at a temperature as low as 220° C. and at 300° C. the speed of reaction has become commercially useful. At this temperature obviously the danger of thermal decomposition of the phenol formed is considerably smaller than at a 100° higher temperature required for the silica gel catalyst.

The invention includes the hydrolysis of homologues of chlorobenzene by means of the said catalysts under similar conditions.

The preferred procedure consists in conducting the vapor of chlorobenzene, or a homologue, and steam over a catalyst at a temperature which, according to the properties of the catalyst selected lies preferably between 300–500° C. The product of hydrolysis may be isolated in known manner.

Certain other impurities may be used in this case in the same manner as copper is prescribed for admixture, without disadvantage to the yield of phenol, and certain additions, for instance of copper, nickel, cobalt, silver, gold, metals of the platinum group or a compound of any of these metals, improve the action of the contact.

It has been found that natural silica bearing materials may be used as catalysts with special advantage, provided they have been sufficiently freed from impurities therein contained which would interfere with the catalytic action, and particularly from iron.

As such materials kieselguhr and natural silicates, such as fuller's earth, clays, asbestos and the like are suitable which materials may, if necessary or desirable, be subjected to the usual treatments before use.

The following examples illustrate the invention:—

1. Kieselguhr is freed as far as possible from iron by a suitable treatment such as for instance by boiling with hydrochloric acid and washing, or by subsequent treatment with sulfides and sulfurous acid, or by any other convenient method. It is then soaked with a solution of about 5 per cent. of its weight of crystallized cupric chloride and formed into grains of pea size, for instance by pressing. Over this catalyst a mixture of 2 parts by weight of water and 1 part by weight of chlorobenzene, both in vapor form, is passed at 500° C. The yield is from 95 to 100 per cent., depending on the degree to which the iron has been removed, and generally about 97 per cent. Under conditions which are otherwise the same, especially as to the copper content, normal kieselguhr yields about from 10 to 30 per cent., while even the purest types only yield a maximum of 60 per cent. unless treated for removal of the iron.

2. Natural silicates such as bleaching earth, Florida earth, fuller's earth, clays, asbestos or the like are freed as far as possible from iron, for instance by the methods indicated in Example 1 A current of 2 parts by weight of water and 1 part by weight of chlorobenzene, both in vapor form, when passed over the said catalysts yields more than 95 per cent. of phenol. The activity of the said catalysts may be multiplied by addition of copper.

Having now fully described my invention and illustrated by many examples the manner in which it may preferably be carried out, I claim:—

1. The method of manufacturing phenols, which comprises causing vapors of halides of the benzene series and steam to react upon each other within a range of a minimum temperature of approximately 300 degrees and a maximum temperature of about 650 degrees C. in the presence of fuller's earth which has previously been freed from iron present as an impurity which is soluble in acids by first treating said fuller's earth with acid capable of dissolving said impurity.

2. The method of manufacturing phenols, which comprises vapors of halides of the benzene series and steam to react upon each other at a temperature of at least approximately 300 degrees C. in the presence of fuller's earth which has been freed from iron present as an impurity which is soluble in acids by first treating said fuller's earth with acid capable of dissolving said impurity.

3. The method of manufacturing phenols, which comprises causing vapors of halides of the benzene series and steam to react upon each other at temperatures of at least approximately 300 degrees C. in the presence of fuller's earth which has been freed from iron present as an impurity which is soluble in acids by first treating the fuller's earth with acid capable of dissolving said impurity, after which a promoter containing a compound of copper has been incorporated with said fuller's earth.

4. The method of manufacturing phenols, which comprises causing vapors of halides of the benzene series and steam to react upon each other at a temperature of at least 300 degrees C. in the presence of fuller's earth which has been freed from iron present as an impurity which is soluble in acids by first treating the fuller's earth with acid capable of dissolving said impurity, after which a promoter containing a compound of copper has been incorporated with said fuller's earth.

5. The method of manufacturing phenols, which comprises causing vapors of halides of the benzene series and steam to react upon each other within a range of a minimum temperature of approximately 300 degrees and a maximum temperature of about 650 degrees C. in the presence of fuller's earth which has previously been freed from undesirable impurities which are soluble in hydrochloric acid by first treating said fuller's earth with an aqueous dilution of at least one strong mineral acid.

6. The method of manufacturing phenols, which comprises vapors of halides of the benzene series and steam to react upon each other at a temperature of at least approximately 300 degrees C. in the presence of fuller's earth which has been freed from undesirable impurities which are soluble in hydrochloric acid by first treating said fuller's earth with an aqueous dilution of at least one strong mineral acid.

7. The method of manufacturing phenols, which comprises causing vapors of halides of the benzene series and steam to react upon each other at temperatures of at least approximately 300 degrees C. in the presence of fuller's earth which has been freed from undesirable impurities which are soluble in hydrochloric acid by first treating the fuller's earth with an aqueous dilution of at least one strong mineral acid, after which a promoter containing a compound of copper has been incorporated with said fuller's earth.

8. The method of manufacturing phenols, which comprises causing vapors of halides of the benzene series and steam to react upon each other at a temperature of at least 300 degrees C. in the presence of fuller's earth which has been freed from undesirable impurities which are soluble in hydrochloric acid by first treating the fuller's earth with an aqueous dilution of at least one strong mineral acid, after which a promoter containing a compound of copper has been incorporated with said fuller's earth.

WALTER PRAHL.